United States Patent Office 3,412,145
Patented Nov. 19, 1968

3,412,145
SEPARATION OF CHLORINATED
PHENOL ISOMERS
Delbert L. Hanna, Oak Park, Ill., assignor to Velsicol
Chemical Corporation, a corporation of Delaware
No Drawing. Filed July 7, 1964, Ser. No. 380,935
4 Claims. (Cl. 260—512)

This invention relates to a new process for the selective recovery of specific chlorinated phenol isomers from a mixture of chlorinated phenol isomers. In particular, this invention relates to a method for the separation of 2,4-dichlorophenol from 2,5-dichlorophenol when both isomers are contained in a mixture of dichlorophenols.

Both 2,4-dichlorophenol and 2,5-dichlorophenol have shown a high degree of commercial value primarily as intermediates in the preparation of herbicides. The 2,4-dichlorophenol is of particular value as the intermediate in the production of 2,4-D, a compound which has widespread application in the herbicide field. 2,5-dichlorophenol has also evidenced strong growth in the herbicide field, it is useful as an intermediate in the production of 2-methoxy-3,6-dichlorobenzoates which have recently been shown to be of significant value as herbicides.

Various methods for the production of mixtures containing 2,4-dichlorophenol and 2,5-dichlorophenol are known to the art, for example, the method proposed by Ohta and Kagami, Kogyo Shikemsho Hokoku, vol. 47, 326–36 (1952), in which isomers of trichlorobenzene are hydrolyzed with caustic in methyl alcohol for 3–5 hours at 200° C. This method gives a mixture of 70–75% of the 2,5-dichlorophenol isomer and 10–15% of the 2,4-isomer and 5% of the 3,4-isomer.

Mixtures of the 2,4-isomer and the 2,5-isomer can be separated readily from impurities such as 3,4-dichlorophenol by methods well known to the art such as vacuum fractional distillation, but problems arise when attempts are made to separate the 2,4-dichlorophenol from the 2,5-dichlorophenol. This separation of the 2,4-isomer from the 2,5-isomer has proven to be extremely difficult. None of the methods known to the art have been successful in achieving both high purity products and good yields. Because of the difficulty in accomplishing this separation, the usual practice has been to use a mixture of the isomers. Where the pure individual isomer is desired, 2,5-dichlorophenol can be recovered by known physical methods such as fractional crystallization, but a substantial portion of the yield (between 30–40%) is lost in the mother liquors which comprise the eutectic mixture of the 2,4-dichlorophenol and the 2,5-isomer. This eutectic mixture has either constituted a waste disposal problem or has been used as a crude phenol mixture. As for the 2,4-isomer, there is no method now available to recover in pure form the 2,4-dichlorophenol from a mixture of dichlorophenols. It has been necessary to use other methods such as chlorination of phenols to obtain this compound.

It is, therefore, an object of the present invention to provide a straightforward method for the selective separation of 2,4-dichlorophenol from a mixture of dichlorophenols.

It is another object of this invention to provide a straightforward method for the selective separation of 2,5-dichlorophenol from a mixture of dichlorophenols.

Another object of the present invention is to provide a method for the separation of 2,4-dichlorophenol from 2,5-dichlorophenol. A further object of the present invention is the production of high purity 2,4-dichlorophenol and high purity 2,5-dichlorophenol in commercially practical yields.

In the method of the present invention the impurities such as various undesired isomers of dichlorophenol are separated from the crude starting mixture by methods well known to the art such as solvent extraction and crystallization, vacuum steam distillation, centrifugation, and the like. These simple physical means of separation are the most commercially practical methods. However, it is not necessary to separate the impurities from the crude mixture in order to accomplish the recovery of the 2,4-dichlorophenol and the 2,5-dichlorophenol. If the crude mixture is treated with a suitable sulfonating agent, the selective sulfonation of the dichlorophenols can be used to separate fractions containing substantially pure 2,4-isomer and 2,5-isomer without first separating out the impurities. Unexpectedly, it has been found that high purity 2,4-isomer and high purity 2,5-isomer can be selectively separated in commercially practical yields if, after a mixture of 2,4-dichlorophenol and 2,5-dichlorophenol has been isolated from all other impurities such as other isomers of dichlorophenol by means well known to the art such as vacuum fractional distillation, and after recovery of some of the 2,5-dichlorophenol by crystallization from this mixture, the remaining mixture rather than being discarded is sulfonated and then hydrolyzed. The sulfonation of this mixture can be either complete or partial depending upon the concentration of sulfonating agent employed. The concentration of the sulfonating agent used must be at least equimolar to the amount of 2,5-dichlorophenol recovered. A preferred concentration of the sulfonating agent is an amount greater than the molar concentration of the 2,5-dichlorophenol portion of the mixture. Typical sulfonating agents which can be utilized in this process are fuming sulfuric acid, sulfuric acid, sulfur trioxide. The preferred sulfonating agent is fuming sulfuric acid. Additional substantially pure 2,5-isomer and also substantially pure 2,4-isomer is thus removed from this mixture and the total quantity of product is significantly higher than is the yield when the mother liquor is discarded.

There are many methods known to the art for hydrolysis of a reaction mixture. Probably the simplest and most commercially expedient method is the use of water as the hydrolyzing agent. Therefore, in the process of the present invention, water was employed wherever it was necessary to perform hydrolysis.

The mixture of dichlorophenols, either the eutectic mixture of 2,5-dichlorophenol and 2,4-dichlorophenol or any other mixture of these compounds not necessarily the eutectic mixture, is partially sulfonated when an amount of sulfonating agent less than the molar concentration of the total dichlorophenol isomers is employed. A preferred concentration of sulfonating agent is an amount greater than the molar concentration of the 2,5-dichlorophenol portion of the mixture and less than the molar concentration of the total dichlorophenol isomers.

When fuming sulfuric acid is used as the sulfonating agent it is added stepwise until the desired concentration is attained under appropriate temperature conditions. A wide range of temperatures are appropriate for the addition of the sulfonating agent, a suitable temperature range being from about room temperature (about 20° C.) to about 150° C., the preferred range being from about 50° C. to about 120° C. and the most preferred temperatures being from about 80° C. to about 100° C. A phenol sulfonic acid solution is thus formed. Subsequent to sulfonation it is convenient to add 3 to 10 parts water to the mixture of sulfonates to prevent the phenol sulfonic acid from crystallizing. The unreacted 2,4-dichlorophenol can be separated by suitable physical means well known to the art, thus taking advantage of the fact that 2,5-dichlorophenol is selectively sulfonated. This separation can be made by removing the unreacted phenol by a process such as solvent extraction (heptane, benzene or other common solvents can be used), vacuum steam distillation and the like. The extracted phenol is extremely rich in 2,4-dichlorophenol, which crystallizes and can then be recovered in pure form by conventional means.

The 2,5-dichlorophenol is recovered by hydrolysis of the remaining dichlorophenol sulfonic acid solution in sulfuric acid (the sulfuric acid left over from the previous sulfonation step is sufficient). The mixture of sulfonates is heated and steam is passed into it. Up to about 105° C., an impure fraction is distilled off. The temperature is raised, for example by boiling off some of the water, and at temperatures of from about 105° C. to about 130° C. a substantially pure fraction of the 2,5-isomer is recovered. After the 2,5-dichlorophenol has been distilled off, the 2,4-dichlorophenol sulfonic acid is hydrolyzed and the 2,4-dichlorophenol is distilled off in substantially pure form at temperatures above about 130° C. with a preferred temperature range of from about 130° C. to about 200° C. and a most preferred range of from about 140° C. to about 160° C. with a most preferred temperature of about 150° C.

When an amount of sulfonating agent, such as fuming sulfuric acid, greater than the molar concentration of the total dichlorophenol isomers is employed, both 2,4-dichlorophenol and 2,5-dichlorophenol are completely sulfonated. After this sulfonation the mixture of sulfonates is subjected to stepwise hydrolysis by steam distillation under controlled conditions of temperature and sulfuric acid concentration. At temperatures up to about 105° C. an impure fraction is obtained, from about 105° C. to about 130° C. substantially pure 2,5-dichlorophenol is recovered. The recovery of the 2,5-isomer, before the other isomer, is due to the preferential hydrolysis which 2,5-dichlorophenol sulfonic acid undergoes as compared to the 2,4-isomer. After the 2,5-dichlorophenol has been distilled off, the 2,4-dichlorophenol sulfonic acid is hydrolyzed and 2,4-dichlorophenol is distilled off in substantially pure form at temperatures above about 130° C. with a preferred temperature range of from about 130° C. to about 200° C. and a most preferred range of from about 140° C. to about 160° C. with a most preferred temperature of about 150° C.

All the steps in the process of this invention are ordinarily carried out at atmospheric pressure but sub- or superatmospheric pressures can be used if desired. One significant result of varying the pressure would be to change the temperatures suitable for the method of this invention, however higher temperatures at increased pressure, for example, are equivalent to the lower temperatures set forth above at atmospheric pressure. The suitable temperatures of this invention would also vary with factors other than pressure such as the presence of additives, but these temperatures would also be equivalent to those set forth above.

The following examples serve to illustrate the process for the separation of 2,4-dichlorophenol from 2,5-dichlorophenol. In the analytical data presented in these examples, the "Other" materials collected are inert materials such as water, and extraneous materials such as anisole, 2,6-dichlorophenol, and 3,4-dichlorophenol which can be eliminated from the mixture by methods common to the art.

EXAMPLE 1

Preparation of the dichlorophenol mixture

Substantially pure 1,2,4-trichlorobenzene was hydroyzed with caustic in methyl alcohol for 3–5 hours at about 200° C. The reaction mixture was then subjected to steam distillation to remove methyl alcohol, trichlorobenzene and anisole. The mixture was then acidified and steam distilled to recover a dichlorophenol mixture. At this point, a part of the 2,5-dichlorophenol was removed by centrifugation. The remaining solution was a mixture containing both the 2,4-isomer and the 2,5-isomer.

EXAMPLE 2

Separation of 2,4-dichlorophenol and 2,5-dichlorophenol

The liquid dichlorophenol mixture of Example 1 (336 grams) was sulfonated with 65% fuming sulfuric acid (150 ml.) at 90°–100° C. The mixture was poured onto ice, filtered, and extracted with three portions of heptane to remove the unreacted phenols. This extracted portion was rich in 2,4-dichlorophenol which crystallized on standing. The solution of dichlorophenol sulfonic acid remaining after the heptane extraction was transferred to a flask. More water was added and the material was refluxed at 103° C., with the simultaneous hydrolysis of the dichlorophenol sulfonic acid solution and steam distillation of dichlorophenol taking place. The phenol portion was collected as it distilled over and the water was recycled. At 103° C., the fraction collected was an oil which was an impure mixtrue of dichlorophenols. By distilling off water from the reaction mixture, the temperature was raised to 112–113° C. and a significant amount of phenol was recovered as the distillate fraction. Both chemical and physical testing proved this product to be substantially pure 2,5-dichlorophenol.

EXAMPLE 3

A crude dichlorophenol mixture (326 g.) and heptane (500 ml.) were charged into a 2 liter flask equipped with a thermometer, condenser, and receiver. Water (19 ml.) was azeotroped off. Fuming sulfuric acid (150 ml.) was then added, the temperature of this highly exothermic reaction was maintained below 45° C. Water (500 ml.) was added again keeping the temperature below 45° C. The mixture was separated in a separatory funnel and an additional 100 ml. of water was required to dissolve the material in the water layer in the separatory funnel. The heptane phase of the reaction mixture was evaporated yielding 60 grams of material. Upon analysis this material was determined to be primarily 2,4-dichlorophenol. The water layer was subjected to stepwise hydrolysis and steam distilled and fractions containing 2,5-dichlorophenol in varying degrees of purity were recovered at temperatures of from about 107° C. to about 150° C. The fractions were analyzed by gas chromatography to yield the following results:

| Temperature (° C.) | Materials collected | Weight (g.) | Percent |
|---|---|---|---|
| 107–120 | 2,4-dichlorophenol | .64 | 5.7 |
|  | 2,5-dichlorophenol | 7.32 | 64.8 |
|  | Other | 3.34 | 29.5 |
| 120 | 2,5-dichlorophenol | 132.2 | 91.5 |
|  | Other | 12.4 | 8.5 |
| 120–130 | 2,5-dichlorophenol | .99 | 61.6 |
|  | Other | .61 | 38.4 |
| 130 | 24-dichlorophenol | .09 | 0.6 |
|  | 2,5-dichlorophenol | 6.30 | 44.39 |
|  | Other | 7.81 | 55.01 |

Above 130° C. the residue was predominantly 2,4-dichlorophenol sulfonic acid, this residue was hydrolyzed and distillation was continued until at about 150° C. and above substantially pure 2,4-dichlorophenol was recovered.

EXAMPLE 4

A crude dichlorophenol mixture (326 g.) was charged into a flask and 65% fuming sulfuric acid (120 ml.) was added keeping the temperature of this highly exothermic reaction below 30° C. After the sulfuric acid addition was completed, water (500 ml.) was added, keeping the temperature down to about 30° C. The reaction mixture was placed in a separatory funnel and the unreacted phenols were extracted with heptane (550 ml.). The heptane phase of the reaction mixture was evaporated yielding 195.5 grams of material. The aqueous layer was added to a three-necked flask fitted with a thermometer, addition tube, condenser and receiver. The mixture was heated until at 106° C. the first portion of phenols distilled over. The fractions obtained by this distillation were collected and analyzed by gas chromatography. The results were as follows:

| Temperature (° C.) | Materials collected | Weight (g.) | Percent |
|---|---|---|---|
| 106-120 | 2,5-dichlorophenol | 3.82 | 44.3 |
|  | Other | 4.78 | 55.7 |
| 120 | 2,5-dichlorophenol | 57.0 | 86.3 |
|  | Other | 9.1 | 13.7 |
| 130 | 2,5-dichlorophenol | 5.95 | 50.0 |
|  | Other | 5.95 | 50.0 |

Above 130° C. the residue was predominantly 2,4-dichlorophenol sulfonic acid, this residue was hydrolyzed and distillation was continued until at about 150° C. and above substantially pure 2,4-dichlorophenol was recovered.

EXAMPLE 5

A crude dichlorophenol mixture (326 g.) was charged into a flask and 65% fuming sulfuric acid (120 ml.) was added keeping the temperature of this highly exothermic reaction below 45° C. After the sulfuric acid addition was completed, water (500 ml.) was added, keeping the reaction temperature down to about 45° C. The reaction mixture was placed in a separatory funnel and the unreacted phenols were extracted with heptane (550 ml.). The heptane phase of the reaction mixture was evaporated yielding 135 grams of material. The aqueous layer was added to a three-necked flask fitted with a thermometer, addition tube, condenser and receiver. The mixture was heated until at 106° C. the first portion of phenols distilled over. The fractions obtained by this distillation were collected and analyzed by gas chromatography. The results were as follows:

| Temperature (° C.) | Materials collected | Weight (g.) | Percent |
|---|---|---|---|
| 106-120 | 2,4-dichlorophenol | .20 | 2 |
|  | 2,5-dichlorophenol | 5.74 | 58 |
|  | Other | 3.96 | 40 |
| 120 | 2,4-dichlorophenol | .4 | .5 |
|  | 2,5-dichlorophenol | 80.4 | 89 |
|  | Other | 9.4 | 10.5 |
| 120-130 | 2,5-dichlorophenol | 1.87 | 77.8 |
|  | Other | .53 | 22.2 |
| 130 | 2,4-dichlorophenol |  | (1) |
|  | 2,5-dichlorophenol | 13.2 | 51.3 |
|  | Other | 12.5 | 48.7 |

[1] Trace.

Above 130° C. the residue was predominantly 2,4-dichlorophenol sulfonic acid, this residue was hydrolyzed and distillation was continued until at about 150° C. and above substantially pure 2,4-dichlorophenol was recovered.

EXAMPLE 6

A mixture of 2,5-dichlorophenol (20 g.) and 2,4-dichlorophenol (20 g.) was sulfonated by the addition of 65% fuming sulfuric acid (31.5 g.) at temperatures between about 80° C. and about 100° C., the temperature of this highly exothermic reaction being kept below 100° C. After the sulfuric acid addition was completed, the mixture was allowed to stand 5 minutes and then water (75 ml.) was added. The mixture was allowed to stand overnight. The clear supernatant liquor which resulted on standing was poured off and saved, and 65% fuming sulfuric acid (20 g.) was added to the small amount of residual unsulfonated oil. Water (25 ml.) was added and this solution was combined with the clear solution drained off earlier. The resulting solution was treated with concentrated sulfuric acid (50 ml.) and water (75 ml.) and the entire charge was placed in a three-necked flask equipped with a stirrer, condenser, thermometer and trap for separating phenols from the refluxing water-phenol mixture. The mixture was heated and at 120° C. the first portion of phenols distilled over. The fractions obtained by this distillation were collected and analyzed by gas chromatography. The results were as follows:

| Temperature (° C.) | Materials collected | Weight (g.) | Percent |
|---|---|---|---|
| 120 | 2,4-dichlorophenol | 3.18 | 15.9 |
|  | 2,5-dichlorophenol | 16.64 | 83.2 |
|  | Other | .18 | .9 |
| 150 | 2,4-dichlorophenol | 11.12 | 67.4 |
|  | 2,5-dichlorophenol | 3.43 | 20.8 |
|  | Other | 1.95 | 11.8 |

EXAMPLE 7

A mixture of 2,5-dichlorophenol (20 g.) and 2,4-dichlorophenol (20 g.) was sulfonated with 65% fuming sulfuric acid (60 g.) at temperatures between about 80° C. and about 100° C., the acid being added over a 15 minute interval. After the sulfuric acid addition was completed, the mixture was allowed to stand 5 minutes and water (100 ml.) was added. Concentrated sulfuric acid (100 ml.) was then added and the mixture was placed in a 500 ml. three-necked flask equipped with a stirrer, condenser, thermometer, and trap for separating phenols from the refluxing water-phenol mixture. The mixture was heated to 120° C. and about 200 ml. of water were added slowly until refluxing began. The fractions obtained by this distillation were collected and analyzed by gas chromatography. The results were as follows:

| Temperature (° C.) | Materials collected | Weight (g.) | Percent |
|---|---|---|---|
| 120 | 2,5-dichlorophenol | 14.17 | 88.6 |
|  | 2,4-dichlorophenol | .63 | 3.9 |
|  | Other | 1.20 | 7.5 |
| 150 | 2,5-dichlorophenol | 3.11 | 25.9 |
|  | 2,4-dichlorophenol | 6.91 | 57.6 |
|  | Other | 1.98 | 15.5 |

I claim:

1. A method for the selective sulfonation of 2,5-dichlorophenol which comprises reacting 2,5-dichlorophenol in a mixture consisting essentially of this compound and 2,4-dichlorophenol with an amount of sulfonating agent selected from the group consisting of fuming sulfuric acid, sulfuric acid and sulfur trioxide less than equimolar to the total dichlorophenol isomers.

2. A method for the selective sulfonation of 2,5-dichlorophenol which comprises reacting the product containing this compound and 2,4-dichlorophenol, obtained by hydrolyzing 1,2,4-trichlorobenzene, with an amount of sulfonating agent selected from the group consisting of fuming sulfuric acid, sulfuric acid and sulfur trioxide less than equimolar to the total dichlorophenol isomers.

3. The method which comprises reacting a mixture consisting essentially of 2,5-dichlorophenol and 2,4-dichlorophenol with sulfonating agent selected from the group consisting of fuming sulfuric acid, sulfuric acid and sulfur trioxide in an amount of greater than equimolar to the total dichlorophenol isomers selectively hydrolyzing the 2,5-dichlorophenol sulfonic acid by stream distilling the product of the sulfonation and recovering 2,5-dichlorophenol as a distillate fraction.

4. The method which comprises reacting the product containing 2,5-dichlorophenol and 2,4-dichlorophenol obtained by hydrolyzing 1,2,4-trichlorobenzene with sulfonating agent selected from the group consisting of fuming sulfuric acid, sulfuric acid and sulfur trioxide in an amount greater than equimolar to the total dichlorophenol isomers selectively hydrolyzing the 2,5-dichlorophenol sulfonic acid by steam distilling the product of the sulfonation and recovering 2,5-dichlorophenol as a distillate fraction.

References Cited

UNITED STATES PATENTS 3,159,685    12/1964    Bradley et al. _____ 260—623

LEON ZITVER, *Primary Examiner.*

W. B. LONE, *Assistant Examiner.*